Feb. 19, 1963 C. H. BURLEY ET AL 3,078,378

ELECTRONIC MULTIPLEXER SYSTEM FOR CONVERTING MULTI-CHANNEL DATA INTO A SINGLE CHANNEL COMPOSITE SIGNAL

Filed June 28, 1960 3 Sheets-Sheet 1

INVENTORS.
CAMERON H. BURLEY
RICHARD E. POSPISIL
BY George Sullivan
Agent

INVENTORS.
CAMERON H. BURLEY
RICHARD E. POSPISIL
BY [signature]
Agent

Feb. 19, 1963 C. H. BURLEY ET AL 3,078,378

ELECTRONIC MULTIPLEXER SYSTEM FOR CONVERTING MULTI-CHANNEL DATA INTO A SINGLE CHANNEL COMPOSITE SIGNAL

Filed June 28, 1960 3 Sheets-Sheet 3

INVENTORS.
CAMERON H. BURLEY
RICHARD E. POSPISIL
BY
George Sullivan
Agent 3,078,378
Patented Feb. 19, 1963

3,078,378

ELECTRONIC MULTIPLEXER SYSTEM FOR CONVERTING MULTI-CHANNEL DATA INTO A SINGLE CHANNEL COMPOSITE SIGNAL

Cameron H. Burley, Sunnyvale, and Richard E. Pospisil, Los Altos, Calif., assignors to Lockheed Aircraft Corporation, Burbank, Calif.

Filed June 28, 1960, Ser. No. 39,301
6 Claims. (Cl. 307—88.5)

This invention relates to means and methods for converting multichannel data into a single channel composite signal.

In missiles, satellites and other advanced systems a considerable need has arisen for the efficient telemetering of large amounts of data from missiles and satellites to one or more remote receiving systems. In particular, various instruments and detectors are provided on missiles and satellites for the purpose of analyzing, recording or detecting information as to temperature, air density, radiation, acceleration, etc., and it is necessary that this data be communicated to a remote location for analysis or study, or to provide information necessary for the operation of ground guidance equipment.

One of the techniques which has been employed to provide an efficient telemetering system involves the use of a multiplexing system in which some form of commutator is employed to periodically sample the particular data from each instrument or detector at a predetermined rate to form a single channel composite signal in which each item of data is present for a short period of time. While such multiplexer systems have been found valuable in some applications, they have the severe disadvantage from the point of view of missile and satellite use that they tend to be highly complex and unreliable as a result of the commutation system employed and the difficulty of sampling the data in such a way that it can be reliably decommutated at a remote location.

Accordingly, it is the broad object of the present invention to provide an improved multiplexer system for converting multi-channel data into a single channel composite signal which can readily be communicated and decommutated.

A more specific object of this invention is to provide an all electronic multiplexer system for converting multi-channel data into a single channel composite signal which does not require any moving parts.

Another object of this invention is to provide a multiplexer system for converting multi-channel data into a single channel composite signal and introducing a reference signal into the composite signal in such a way that the deleterious effect of switching transients is greatly reduced.

A further object of this invention is to provide an improved gating system for converting multi-channel data into a single channel composite signal in a relatively simple manner which overcomes the problem of varying pedestal and does not feed back detrimental signals to the detectors or instruments supplying the data.

Still another object of this invention is to provide improved means and methods for introducing a reference signal into a single channel composite signal in a manner so that increased reliability and simplicity are achieved and the D.-C. level of each item of data can be recovered.

Yet another object of the present invention is to provide systems and circuitry in accordance with the above-mentioned objects which can be adapted in simple and compact form for use in missiles and satellites.

In a typical embodiment of the invention, each of a plurality of data signals are fed to one of a plurality of substantially identical gates having a common output. These gates are consecutively opened in a continuous manner so that there is always only one gate open at any one time, thereby producing a single channel composite signal having constant pedestal. Also, each gate is specially adapted so there is no feedback to the instruments or detectors from which the data signals are derived.

The single channel composite signal is now amplified by a D.-C. amplifier and then fed to a mixer gate which introduces a reference voltage into the single channel composite signal in such a way that only the middle portion of each data signal is retained, thereby eliminating undesirable transient switching noise which is ordinarily present at the beginning and end of each signal in the composite signal. The resultant single channel composite signal may then be fed to suitable apparatus, such as a transmitter for communication to a remote location where it may be suitably decommutated.

The specific nature of the invention as well as other objects, uses and advantages thereof will clearly appear from the following description and from the accompanying drawing in which.

Like numerals designate like elements throughout the figures of the drawing.

Figure 1:
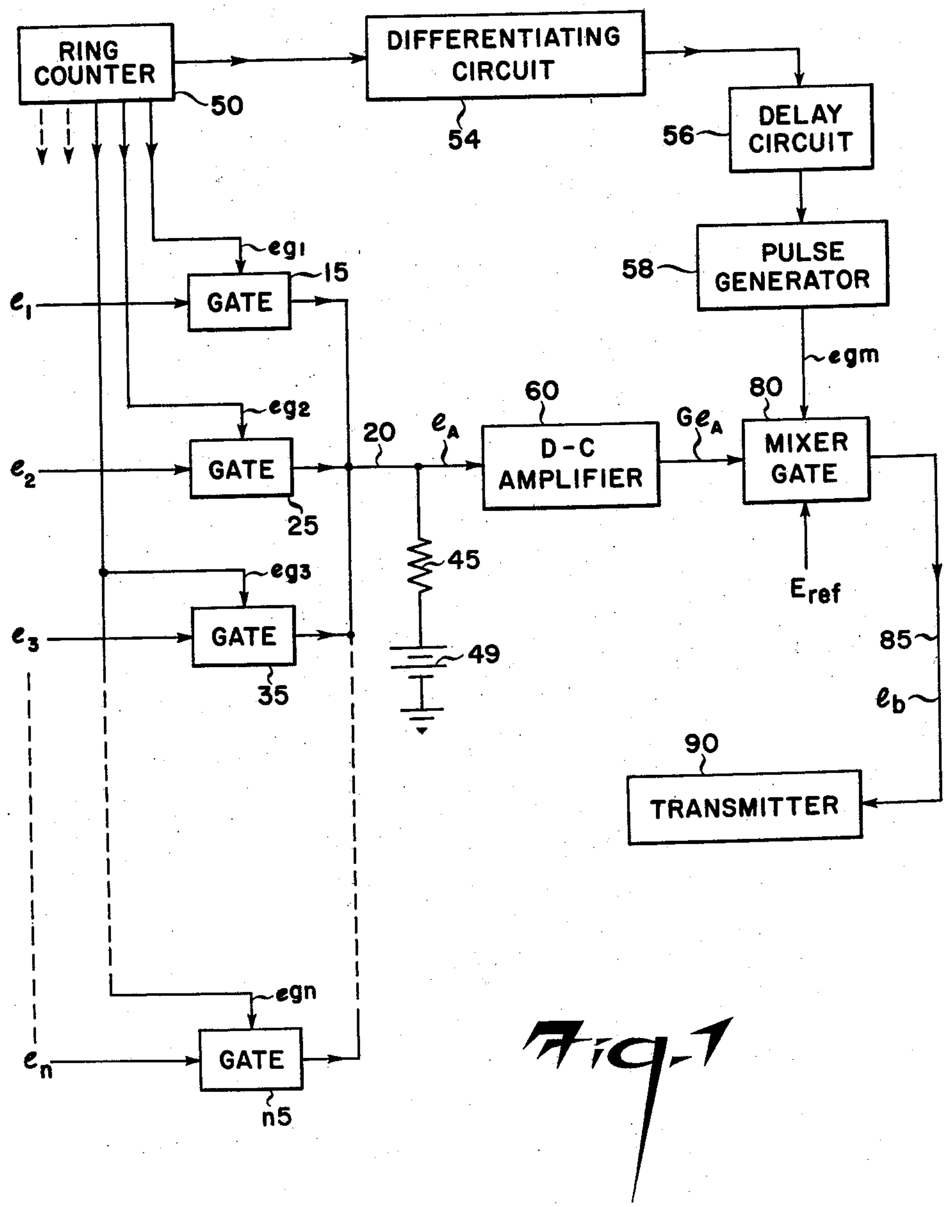
FIG. 1 is a block diagram of a multiplexer system for converting multi-channel data signals into a single channel composite signal in accordance with the invention.

In FIG. 1, the letters $e_1, e_2, e_3 \ldots e_n$ represent a plurality of signals which might be obtained from instruments or detectors on a missile or satellite. These input signals $e_1, e_2, e_3 \ldots e_n$ are fed to the gates 15, 25, 35 . . . *n*5, respectively, one gate being provided for each input signal. These gates 15, 25, 35 . . . *n*5 are adapted to be consecutively and continuously opened for a predetermined amount of time T in response to the output gating signals obtained from a ring counter 50. In typical operation, the ring counter 50 first opens only the gate 15 for the time T leaving the other gates closed, then opens only the gate 25 for the time T, then only the gate 35 for the time T, and so on, until only the last gate *n*5 is opened for the time T, whereupon the ring counter 50 starts all over again to open the gate 15 for the time T without any interruption, the cycle repeating continuously. Those skilled in the art will realize that the provision of a ring counter or other device which will provide this type of operation of a plurality of gates is well within present knowledge in the art.

All the gates 15, 25, 35 . . . *n*5 have a common load indicated at 45 and a common D.-C. power source represented by a battery 49. Since there is always one gate open at any one time, and all the gates are substantially identical, the D.-C. source 49 will see a constant load so that the D.-C. output level (or pedestal) remains constant, even though the gates are continuously being switched.

Figure 2:
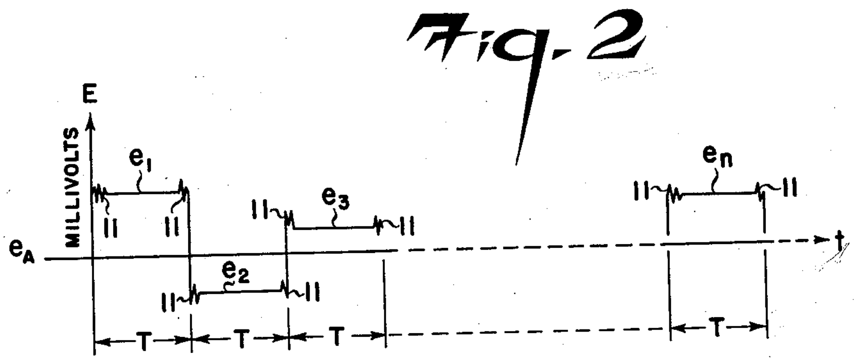
FIGS. 2 and 3 are graphs which will be used in explaining the operation of the system of FIG. 1.

FIG. 2 is a graph illustrating one cycle of the single channel composite signal $e_A$ appearing at the output lead 20. It will be seen that each of the signals $e_1, e_2, e_3 \ldots e_n$ consecutively appear in the composite output signal $e_A$ for equal periods of time T. Because the signals $e_1, e_2, e_3 \ldots e_n$ are usually of relatively low signal levels, switching transients such as indicated at 11 ordinarily will form a significant part of the output signal as shown in FIG. 2. For example, the voltage axis E of the graph in FIG. 2 is indicated as being of the order of millivolts which is a typical order of magnitude of the input data signals $e_1$, $e_2$, $e_3$ . . . $e_n$, and for such low levels the switching transients might be as shown at 11.

Figure 3:
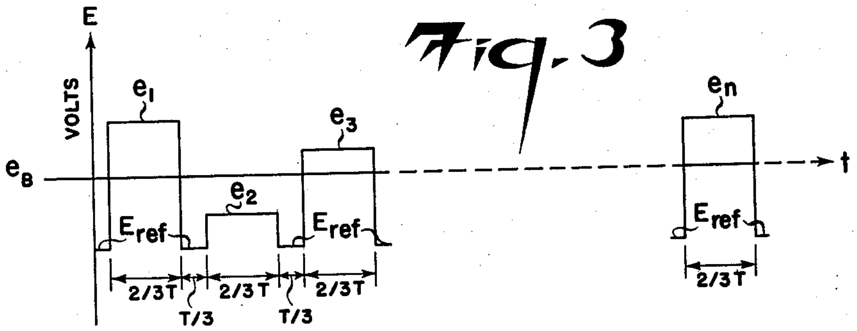

The D.-C. amplifier 60 amplifies the composite signal $e_A$ to a level of the order of volts to provide a signal $Ge_A$ which is merely an amplified representation of the signal shown in FIG. 2, the letter G representing the gain of the amplifier 60. This amplified composite signal $Ge_A$ is now fed to a mixer gate 80 which periodically introduces a D.-C. reference voltage $E_{ref}$ into the composite signal at a rate equal to the rate of switching of the gates 15, 25, 35 . . . $n5$ and at a time so that the beginning and end of each data signal in the composite signal is eliminated. The resulting composite signal $e_B$ obtained at the output 85 of the mixer gate 80 is shown in the graph of FIG. 3. It can be seen from FIG. 3 that because the beginning and end of each data signal in the composite signal is replaced by the reference voltage $E_{ref}$, the switching transients occurring at these places as shown by 11 in FIG. 2 are substantially eliminated, leaving essentially only the reference voltage $E_{ref}$ and the data signals in the resulting composite signal $e_B$ of FIG. 3. Since the D.-C. amplifier 60 has amplified the original composite signal $e_A$ to the order of volts as indicated on the voltage axis E of FIG. 3, switching transients introduced by the mixer gate 80 (which may be of the order of millivolts) are negligible.

A number of ways of gating the mixer gate 80 so as to introduce the reference voltage $E_{ref}$ into the composite signal $Ge_A$ as shown in FIG. 3 will no doubt occur to those skilled in the art. One convenient way is illustrated in the system of FIG. 1. By any suitable means a pulse can be derived from the ring counter 50 corresponding to each step thereof, that is a pulse corresponding to the opening of each of the gates 15, 25, 35 . . . $n5$. The deriving of such a pulse from a ring counter is a simple expedient and well known to those skilled in the art. This pulse derived from the ring counter 50 is first differentiated by a differentiating circuit 54 to obtain a sharp rise time and then delayed by a delay circuit 56 to provide a pulse corresponding to the time at which it is desired that the reference signal be introduced. For the graph shown in FIG. 3, the delay provided would be $2T/3$. The delayed pulse at the ouput of the delay circuit 56 is now fed to a pulse generator 58 (such as a blocking oscillator) which will provide a pulse $e_{gm}$ of proper duration for feeding to the mixer gate 80. For the graph shown in FIG. 3, the duration of the pulse $e_{gm}$ would be $T/3$.

It will be understood from the foregoing, therefore, that the use of a D.-C. reference voltage $E_{ref}$ interposed at the beginning and end of each input data signal is of very considerable significance, since not only are transient signals effectively eliminated as indicated in FIG. 3, but in addition, the response times of the gates 15, 25, 35 . . . $n5$ may now be made relatively slow and special precautions need not be taken to reduce switching transients as in prior art systems. The result is that the gating circuits 15, 25, 35 . . . $n5$ may be very much simpler as compared to the complex circuitry now employed in presently known systems. It will also be understood that the introduction of the reference voltage $E_{ref}$ in the composite signal for each appearance of an input signal makes it possible to readily recover the D.-C. level of the input signal after decommutation. The composite signal $e_B$ at the output of the mixer gate 80 can thus be treated as an ordinary A.-C. signal without having to worry about recovering the D.-C. level.

The single channel composite output signal $e_B$ from the mixer gate 80 may now be fed to a transmitter 90 for radiation to a receiver at a remote location where the composite signal can be demodulated and the input data signals $e_1$, $e_2$, $e_3$ . . . $e_n$ recovered. The techniques for decommutating such signals are well known to those in the art and the particulars of such decommutating systems are not within the scope of the present invention.

Figure 4:
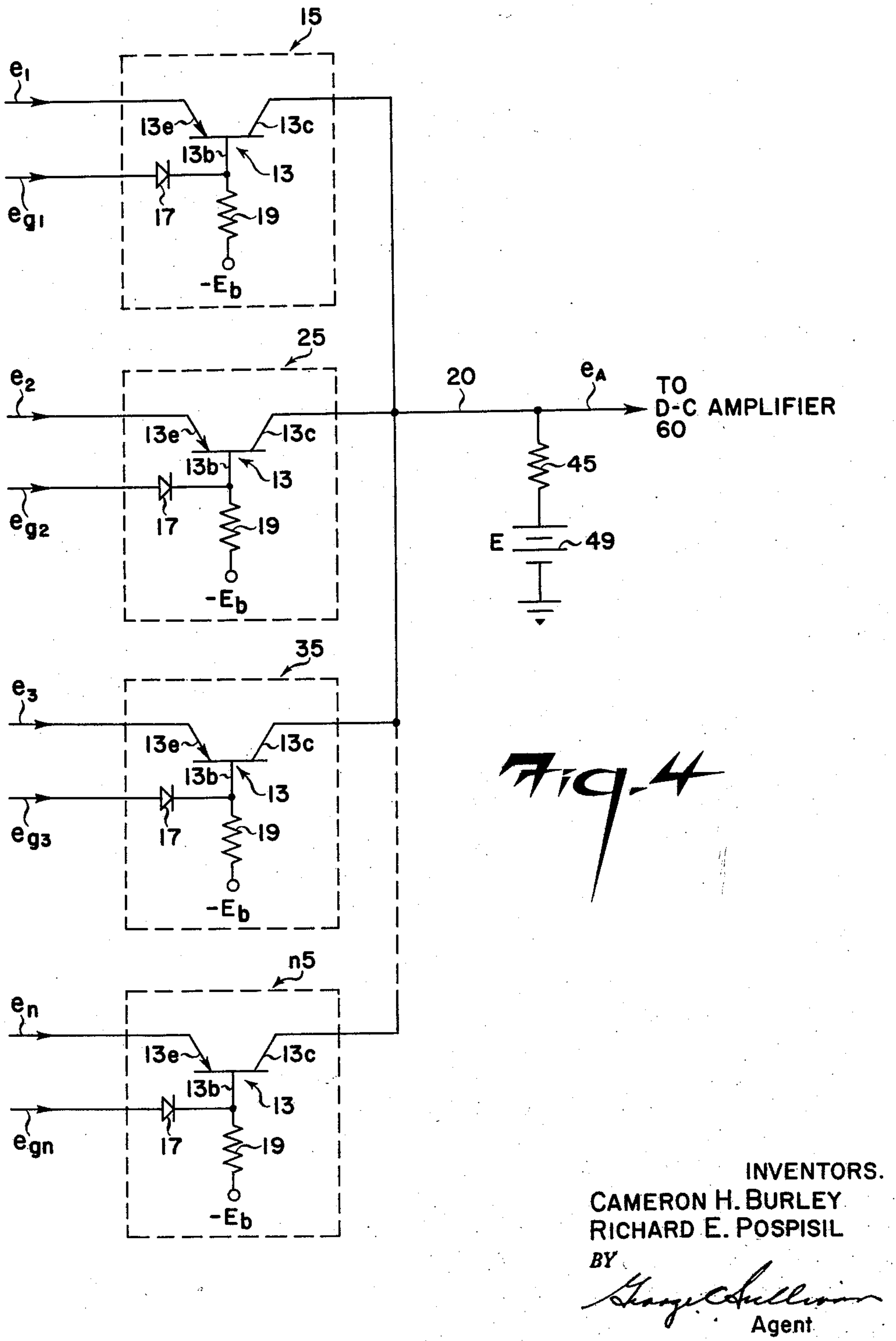
FIG. 4 is a circuit diagram illustrating an advantageous form of gating arrangement which may be employed in the circuit of FIG. 1.

FIG. 4 is a circuit diagram showing advantageous circuitry which may be employed for the gates 15, 25, 35 . . . $n5$ in the system of FIG. 1. As indicated in FIG. 4, each of the gates 15, 25, 35 . . . $n5$ are identical, each having the same simple circuit comprising a transistor 13, a diode 17, a base resistor 19 and a bias voltage $-E_b$ of substantially the same values. The designations $e_1$, $e_2$, $e_3$ . . . $e_n$ and $e_{g1}$, $e_{g2}$, $e_{g3}$ . . . $e_{gn}$ in FIG. 4 corresponding to input data signals and gating signals, respectively, refer to similar designations in FIG. 1. For purposes of explanataion the description and operation of the gates 15, 25, 35 . . . $n5$ will be made primarily by reference to gate 15.

The gate 15 comprises the transistor 13 having a base $13_b$, a collector $13_c$ and an emitter $13_e$. The input data signal $e_1$ is applied to the emitter $13_e$, and the gating signal $e_{g1}$ is fed to the base $13_b$ through a diode 17. The collector $13_c$ is connected to the common output lead 20 across which is connected the common load resistor 45 and the common D.-C. source 49 in series, the magnitude of the D.-C. source 49 being designated as E.

The transistor 13 is selected for good low level signal switching characteristics; that is, a low saturation impedance, a high cut-off impedance and a low offset voltage collector to emitter. Also, both junctions should have a voltage breakdown rating somewhat higher than the signals to be handled in order to prevent the transistor from being damaged. Suitable transistors are commercially available and any of a variety of well known types may be employed. Although a transistor of the PNP type is shown in FIG. 4, it is to be understood that a transistor of the NPN type could appropriately be used if so desired.

The gating signal $e_{g1}$ is chosen so that when it is desired to have the gate 15 closed, the gating signal $e_{g1}$ has a positive voltage which is sufficient to maintain the base $13_b$ of the transistor 13 cut off for all possible voltage values of the input data signal $e_1$; that is, the presence of this positive gating voltage prevents the negative bias voltage $-E_b$ from being applied to the base $13_b$ to saturate the transistor 13. This positive gating voltage is limited by the breakdown voltages of the transistor junctions. When the gate 15 is to be opened, the gating voltage $e_{g1}$ switches to a value more negative than the range of the input data signal $e_1$ and limited only by the breakdown voltage of the diode 17. This effectively permits the negative bias voltage $-E_b$ to be applied to the base $13_b$ to saturate the transistor 13 and the input data signal $e_1$ will pass through the transistor 13 to the output lead 20.

The bias voltage $-E_b$ and the magnitude E of the D.-C. voltage source are chosen in conjunction with the magnitudes of the resistors 19 and 45 so that when the transistor 13 is saturated, the voltage appearing at the base $13_b$ will be substantially equal to zero for zero input voltage $e_1$. Since the voltage E is positive and the bias voltage $-E_b$ is negative, the resistors 45 and 19 can readily be adjusted for this condition. For such an adjustment it will be understood that the flow of saturating current will be from the D.-C. source 49 through the load resistor 45, the collector to base junction, and the base resistor 19 to the bias voltage $-E_b$, and no saturating current will flow to the data signal source $e_1$. The voltage appearing at the output lead 20 will then be the input data signal $e_1$ plus a constant voltage equal to the emitter to collector offset voltage. Since one gate, that is one transistor 13, will always be saturated at any one time as explained previously, and the gates are all identical, the common voltage source 49 will always see the same load and the same current will flow therefrom. The pedestal appearing at the output lead 20, therefore, will remain constant as the gates are switched, except of course for possible switching transients such as indicated at 11 in FIG. 2. Those skilled in the art will appreciate that the ring counter 50 of FIG. 1 can readily be adapted to provide the necessary magnitudes of the gating signals $e_{g1}$, $e_{g2}$, $e_{g3}$ . . . $e_{gn}$ to open and close the gates as just described.

The composite single channel output signal from the gating system illustrated in FIG. 4 is thus substantially as shown in FIG. 2. The constant pedestal due to offset is not shown and can be eliminated by a D.-C. level control in the D.-C. amplifier 60.

It will be noted in connection with FIG. 4 that the gates operate by saturating the collector-base junction instead of the more usual saturation of the emitter-base junction. This is not essential and if so desired the connections of the emitters and collectors in the transistors 13 of FIG. 4 could be reversed. The particular designations of the emitter and collector of the transistor 13 are not important as long as a sufficiently low saturation impedance is obtained and adjustment can be made for zero voltage at the base $13_b$ for zero input signal so that there will be no feedback to the input data sources.

Figure 5:
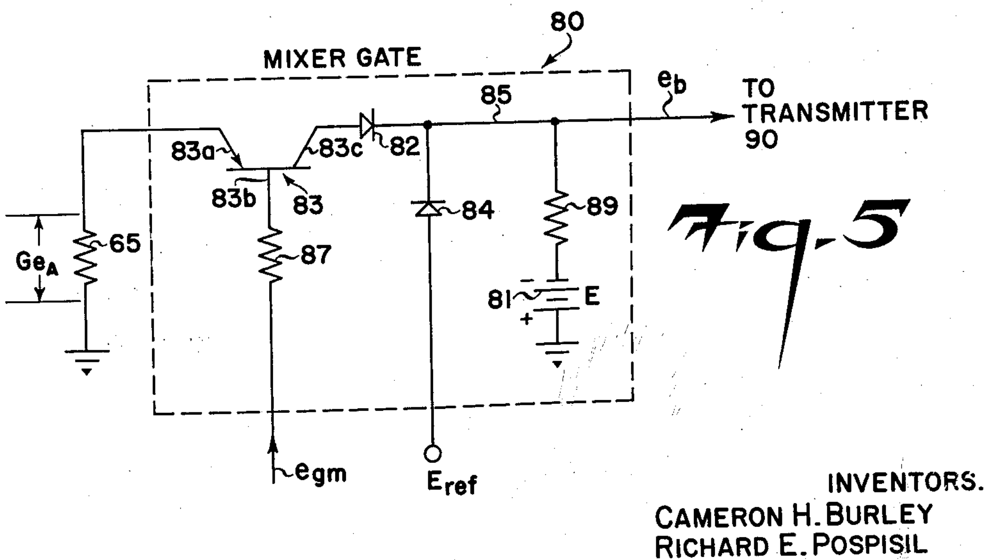
FIG. 5 is a circuit diagram illustrating an advantageous type of mixer gate which may be employed as the mixer gate in FIG. 1.

FIG. 5 illustrates a specific type of mixer 80 which may advantageously be employed in the system of FIG. 1. The mixer gate 80 comprises a transistor 83, two diodes 82 and 84, resistors 87 and 89, and the D.-C. voltage source 81 having a voltage E in series with the resistor 89. The output from the D.-C. amplifier 60 is represented in FIG. 5 as a resistor 65 across which appears the amplified composite signal $Ge_A$. The value of the D.-C. amplifier output impedance represented by the resistor 65 is chosen to be relatively small as compared to the resistance of the load resistor 89.

The D.-C. amplifier output resistor 65 is connected between circuit ground and the emitter $83_a$ of the transistor 83, the gating signal $e_{gm}$ from the pulse generator 58 (FIG. 1) is applied to the base $83_b$ of the transistor through a resistor 87, the collector $83_c$ of the transistor 83 is connected to the output lead 85 through the diode 82, and the reference voltage $E_{ref}$ is fed to the output lead 85 through the diode 84. Both diodes are poled in the direction of positive current flow to the output lead 85. The D.-C. voltage source 81 in series with the load resistor 89 is connected between the output lead 85 and circuit ground.

The transistor 83 like the transistors 13 in FIG. 4 is selected for good switching characteristics. Also, each junction must be able to withstand a reverse bias voltage larger than the signal $Ge_A$ to be handled. The reference voltage $E_{ref}$ is chosen more negative than any value of the input voltage $Ge_A$, and the D.-C. source voltage 81 is chosen more negative than both.

The gating pulses $e_{gm}$ from the pulse generator 58 are adapted to alternate between two values. In the absence of a pulse from the pulse generator 58 when it is desired that the composite signal pass through the mixer gate 80, the gating signal $e_{gm}$ is chosen to have a sufficiently negative value to saturate the transistor 83 for all possible values of the input signal $Ge_A$. Since the reference voltage $E_{ref}$ has been chosen more negative than any value of $Ge_A$, and the resistor 65 is very much smaller than the load resistor 89, the diode 84 is reverse biased so that the reference voltage $E_{ref}$ is isolated from the output lead 80 and the diode 82 is forward biased to permit the input signal $Ge_A$ to pass through the saturated transistor 83 and the forward biased diode 82 to the output lead 85. It should be noted that saturation in the mixing gate 80 of FIG. 5 is accomplished by a saturating current flowing through the base-emitter circuit of the transistor 83 unlike that of the low level gates 15, 25, 35 . . . n5 of FIG. 4. This is possible in the circuit of FIG. 5 without detrimental effects because of the low output impedance of the D.-C. amplifier 60 represented by the resistor 65, so that current flow therethrough does not affect the output voltage $Ge_A$ or interfere with D.-C. amplifier operation.

When it is desired to introduce the reference signal $E_{ref}$ into the composite signal $Ge_A$, the gating signal $e_{gm}$ is triggered by the output of the pulse generator 58 in FIG. 1 to a sufficiently positive voltage so that the transistor 83 is cut off for all possible values of the input signal $Ge_A$. Thus the positive value of $e_{gm}$ must be greater than the most positive value of $Ge_A$ and also more positive than the reference voltage $E_{ref}$. Consequently, when the transistor 83 is cut off at the time and for the duration determined by the pulse generator 58, the input signal $Ge_A$ will be isolated from the output lead 85; and, since the voltage E of the D.-C. source 81 is chosen more negative than the value of $E_{ref}$, positive current flow be from $E_{ref}$ to the D.-C. source 81 of voltage E through the resistor 89. The diode 84, therefore, will be forward biased and $-E_b$ the voltage appearing at the output lead 85 will merely be the reference voltage $E_{ref}$.

To summarize a complete cycle of operation of the mixer gate 80 of FIG. 5, let us assume that the gating voltage $e_{gm}$ is initially at its negative value. Saturating current then flows through the resistor 87, the emitter-base junction of the transistor 83, and the D.-C. amplifier output load resistor 65, causing the input voltage $Ge_A$ to pass through the saturated transistor 83 and the forward-biased diode 82 to the output lead 85. When the gating voltage $e_{gm}$ is switched to its positive value by the pulse generator 58 to permit the reference voltage $E_{ref}$ to be inserted into the composite signal, the transistor 83 cuts off, the diode 84 becomes forward biased as a result of current flow from $E_{ref}$ to E, so that the reference voltage $E_{ref}$ appears at the output lead 85. The cycle then repeats continuously. The resultant composite signal $e_B$ appearing at the output lead 85 of the mixer gate 80 is shown in FIG. 3. Note that $E_{ref}$ is chosen more negative than any value of the input signal $Ge_A$. Those skilled in the art will appreciate that the pulse generator 58 of FIG. 1 can readily be adapted to provide gating signals $e_{gm}$ which alternate between positive and negative values as described herein.

The purpose of the diode 82 in the mixer gate 80 has not yet been explained. It is provided so that it will compensate for the voltage drop appearing across the diode 84. These diodes 82 and 84 are preferably identical so that their voltage drops will vary similarly with changes in temperature. The off-set due to the drop across the transistor 83 is relatively small as compared to the input signal $Ge_A$ and since it is predictable, compensation may be provided therefor by suitably adjusting the reference voltage $E_{ref}$.

One of the important features of the mixer gate 80 shown in FIG. 5 is that besides being remarkably simple, it permits switching between the composite signal $Ge_A$ and the reference signal $E_{ref}$ by the expeditious means of a single control input signal, this being the gating signal $e_{gm}$. Also, like the transistor 13, the transistor 83 may be either of the PNP or NPN type and the emitter and collector thereof may be reversed.

Thus, the combined signal $e_B$ obtained at the output lead 85 which is fed to the transmitter 90 now consists of alternate samples of the input signal $Ge_A$ and the reference signal $E_{ref}$. Since each data input signal can now always be compared to a corresponding reference signal $E_{ref}$, the resultant composite signal $e_B$ can be treated as an A.-C. signal for future operations without causing the D.-C. level of any of the input signals to be lost.

It is to be understood in connection with this invention that the circuitry shown in block form in FIG. 1 which has not been described in detail is all of a type which can readily be provided by those skilled in the art. Since the particular structures of these circuits are not material to the specific invention described and claimed herein, they have not been described in detail. It will be appreciated, however, that based on the description and operation of the invention provided herein, the necessary circuits and devices for operation in accordance with the invention can readily be provided to permit this invention to be practiced with the advantages stated.

It is also to be understood in connection with the present invention that the particular embodiments described herein are only exemplary and that various modifications in construction and arrangement are possible without departing from the spirit of this invention. The invention, therefore, is to be considered as including all possible modifications and variations in construction and arrangement coming within the scope of the invention as defined in the appended claims.

We claim as our invention:

1. Means for converting multi-channel data into a single channel composite signal comprising a plurality of gates, each data signal being fed to the input of one of said gates, a common load and a common D.-C. power source to which the outputs of said gates are applied, a ring counter coupled to said gates for consecutively opening said gates in a continuous manner so that there is always only one gate open at any one time, each of said gates adapted to draw substantially the same current from said common D.-C. source, the output signal obtained across said common load thereby producing a constant pedestal single channel composite signal in which each data signal is present for a predetermined time, amplification means for amplifying said single channel composite signal, a mixer gate to which the amplified composite signal is fed, a D.-C. reference signal also fed to said mixer gate, means responsive to said ring counter for generating a gating signal which has a time duration less than the open time of one of said gates, and means for connecting last said gating signal generating means to said mixer gate so as to permit only the middle portion of each input data signal to be retained.

2. Means for converting multi-channel data into a single channel composite signal comprising a plurality of gates, each data signal being fed to the input of one of said gates, a common load and a common D.-C. power source to which the outputs of said gates are applied, and a ring counter coupled to said gates for consecutively opening said gates in a continuous manner so that there is always only one gate open at any one time, each of said gates comprising a transistor having a base, an emitter and a collector, a diode coupled between said base and said ring counter, a saturating D.-C. bias voltage source having a polarity opposite to that of said common D.-C. source, and a resistor coupled between said base and said saturating D.-C. bias voltage source, the data signal applied to each gate being coupled to one of said emitter and collector, and the other of said emitter and collector being coupled to said common load and common D.-C. source, said ring counter and said diode cooperating to prevent said saturating D.-C. bias voltage from saturating said transistor until the gate is to be opened, said base resistor and said common load being proportioned in conjunction with said D.-C. saturating bias voltage and said common D.-C. source so that when said transistor is saturated the voltage appearing at said base is substantially zero when the input data signal is also substantially zero.

3. The invention in accordance with claim 2, wherein the data signal is applied to said emitter and said collector is coupled to said common load and said common D.-C. source.

4. A mixer gate for introducing constant voltage reference pulses into an input signal, said mixer gate comprising an output lead, a transistor having a base, an emitter and a collector, means applying said input signal to one of said emitter and collector, means coupling the other of said emitter and collector to said output lead, a load resistor and a D.-C. source in series also connected to said output lead, a D.-C. reference voltage source, a diode interposed between said D.-C. reference voltage source and said output lead, a base resistor, and a ring counter coupled to said base through said base resistor, said ring counter adapted to saturate said transsistor during periods when said reference voltage is not to appear at said output lead and cut off said transistor during periods when said reference voltage is to appear at said output lead, the magnitude of said reference voltage and the polarity of said diode being chosen in conjunction with the magnitude of said D.-C. source so that when said transistor is cut off said diode is forward biased causing said reference voltage to appear at said output lead, said reference voltage further being chosen so that when said transistor is cut-off said diode will be reverse biased for expected values of said input signal, and said load resistor being chosen relatively large as compared to the impedance associated with said input signal, said input signal thereby appearing at said output lead when said transistor is saturated.

5. The invention in accordance with claim 4 wherein a second diode is provided interposed between said output lead and said other of said collector and emitter and poled in the same direction as said first mentioned diode with respect to said output lead, said second diode being chosen to compensate for the forward biased voltage drop of said first diode and variations thereof caused by changes in temperature.

6. A multiplexer system for converting a plurality of data sources into a single composite signal comprising a plurality of gates, one of said gates being associated with each data source, each of said gates having an input terminal connected to one of said data sources, an output terminal, and a control terminal, a ring counter connected to said control terminals for producing pulses for opening each of said gates in repetitive sequence, a common load, means for connecting said output terminals to said load, means for differentiating the output of said ring counter, means for delaying the output of said differentiating means, means responsive to said delay means for generating a pulse having a time duration less than the duration of the pulses produced by said ring counter, a reference voltage source, and a mixer gate responsive to said pulse generating means, to said reference voltage, and to said common load, said mixer gate adapted to cause passage of the sum of the reference voltage and the voltage across the load during the presence of last said pulse and to cause the passage of said reference voltage at all other times.

References Cited in the file of this patent

UNITED STATES PATENTS

| | | |
|---|---|---|
| 2,689,949 | Kalbach | Sept. 21, 1954 |
| 2,928,900 | Pawley | Mar. 15, 1960 |
| 2,937,369 | Newbold | May 17, 1960 |
| 2,970,301 | Rochelle | Jan. 31, 1961 |